United States Patent [19]

Urata et al.

[11] Patent Number: 4,558,367
[45] Date of Patent: Dec. 10, 1985

[54] AUTOMATIC FOCUSING DEVICE FOR VIDEO CAMERA

[75] Inventors: Shinji Urata; Hitoshi Hirobe; Kohei Iketani, all of Tokyo, Japan

[73] Assignee: Asahi Kogaku Kogyo Kabushiki Kaisha, Tokyo, Japan

[21] Appl. No.: 434,270

[22] Filed: Sep. 30, 1982

[30] Foreign Application Priority Data

Jan. 19, 1982 [JP] Japan .................................. 57-5358

[51] Int. Cl.⁴ ............................................. H04N 9/28
[52] U.S. Cl. .................................. 358/227; 352/140; 354/400
[58] Field of Search ..................... 358/227, 250, 55; 354/400, 402, 403, 404, 406, 407, 408; 352/139, 140

[56] References Cited

U.S. PATENT DOCUMENTS

| | | | |
|---|---|---|---|
| 4,041,505 | 8/1977 | Hartmann | 354/404 |
| 4,382,665 | 5/1983 | Eguchi | 358/227 |
| 4,414,575 | 11/1983 | Yamamoto | 358/227 |
| 4,422,097 | 12/1983 | Injiya | 358/227 |

Primary Examiner—Tommy P. Chin
Attorney, Agent, or Firm—Browdy and Neimark

[57] ABSTRACT

An automatic focusing device for video camera in which the distance between a lens mounting section of a camera body and the imaging plane of an imaging unit is varied for focusing by moving at least either a lens mounting section or the imaging plane along the optical axis. The device comprises focus detector for receiving the data about an object through a light splitter and driving circuit for varying the distance between lens mounting section and imaging plane according to the output of the focus detector.

6 Claims, 8 Drawing Figures

AUTOMATIC FOCUSING DEVICE FOR VIDEO CAMERA

BACKGROUND OF THE INVENTION

1. Field of the Invention

This invention relates to an automatic focusing device for a video camera which uses a taking lens of a fixed type or a replaceable type.

2. Description of the Prior Art

As the prior art automatic focusing device used for video cameras, there are those shown in FIGS. 1 and 2. In these automatic focusing devices, a taking lens 3 is mounted in a lens mounting section 2 of the camera body 1. The taking lens 3 is provided with a focusing ring 4 for effecting focusing. A gear 5 meshing with the ring 4 can be driven from a motor M mounted in the camera body 1 to move the taking lens 3 in the direction of the optical axis. In the construction of FIG. 1, the motor M is controlled by a motor driving circuit 11, which is in turn controlled by a signal processing circuit 10. A light splitter 6 is provided in the camera body 1 on the optical axis of the taking lens 3. The object data form the lens 3 is thus coupled through an imaging unit 7 and a signal processing circuit 8 and also coupled to the signal processing circuit 10 through a focus detector 9. In the construction of FIG. 2, the motor M is controlled by a signal processing circuit 13, which is in turn controlled by a focus signal extracting circuit 12, which extracts focus signal from an imaging unit 7. In either case, the motor M is controlled by feedback control unit from which a focus signal is produced. In this control, the taking lens 3 is moved in the direction of the optical axis with the rotation of a helicoid, not shown, caused by turning the focusing ring 4.

In these devices, however, the taking lens shares the mechanism of the automatic focusing device, so that the mechanism involved is quite complicated. Further, if the taking lens is not fixed but is replaceable, it is necessary to provide a form of driving which has versatility with respect to various interchangeable lenses that may be prepared. In this case, therefore, it is inevitable that the mechanism is more complicated and that the weight and price are further increased. Further, movable parts such as focusing ring and gear are found on the outside of the camera body. Therefore, these parts are liable to interfere with an object and be damaged, thus sometimes disabling the taking.

SUMMARY OF THE INVENTION

An object of the present invention, accordingly, is to solve the above problems by permitting the distance between the taking lens mounting section of the camera body and the imaging plane to be varied for focusing by causing displacement of at least either the lens mounting section or imaging plane along of the optical axis.

DETAILED DESCRIPTION OF PREFERRED EMBODIMENTS

Figure 1:
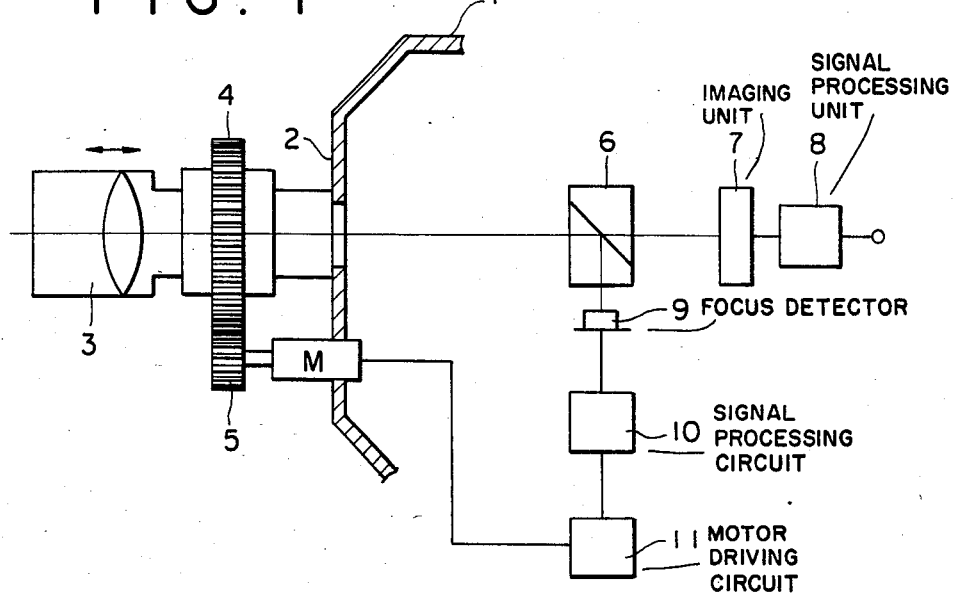
FIGS. 1 and 2 are schematic views showing respective prior art examples of the automatic focusing device.
Figure 2:
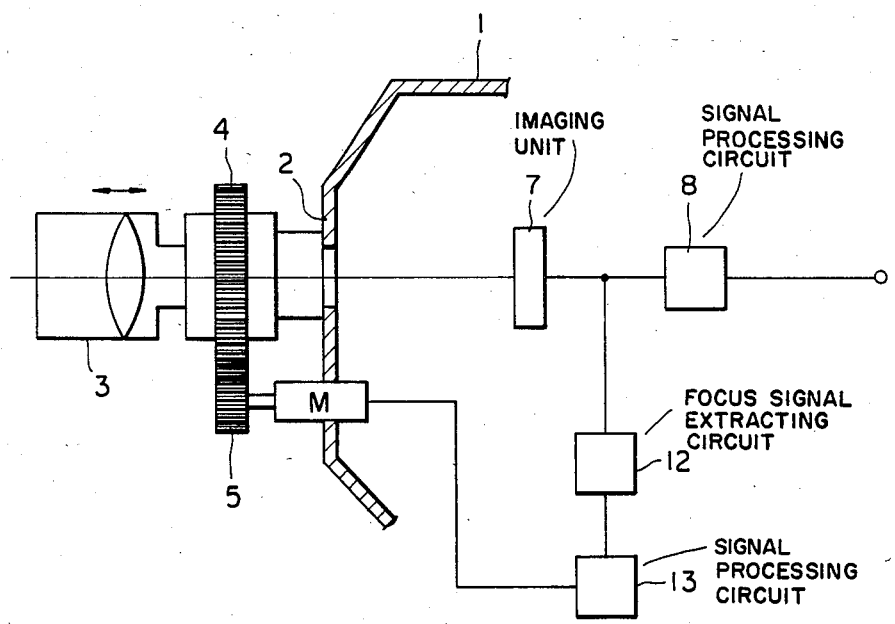

The present invention will now be described with reference to the drawings.

FIGS. 3 to 8 show embodiments of the present invention. Parts which are the same as or equivalent to those in the prior art described above are designated by like reference numerals, and their duplicated description will not be given.

The taking lens 14 may be either of the fixed type or replaceable type. Further, the focusing ring is fixed in position, or it has no focusing mechanism and is mounted in a lens mounting section 15a in a lens mounting member 15 or in a lens mounting section 1a of the camera body 1. The lens mounting member 15 is mounted in the camera body 1 for movement along the optical axis of the taking lens 14, for varying the distance l between the lens mounting section 15a and the imaging plate 7a of the imaging unit 7. Where the taking lens 14 is mounted in the camera body 1, the imaging unit 7 is movable along the optical axis of the taking lens 14, for varying the distance l between the lens mounting section 1a and imaging plane of the imaging unit 7a. It is to be understood that in the automatic focusing device according to the present invention either the lens mounting section 1a or 15a or the imaging plane 7a is moved. The lens mounting section 1a or 15a or the imaging plane 7a can be moved in various ways, which will be described with reference to FIGS. 3 to 8.

Figure 3:
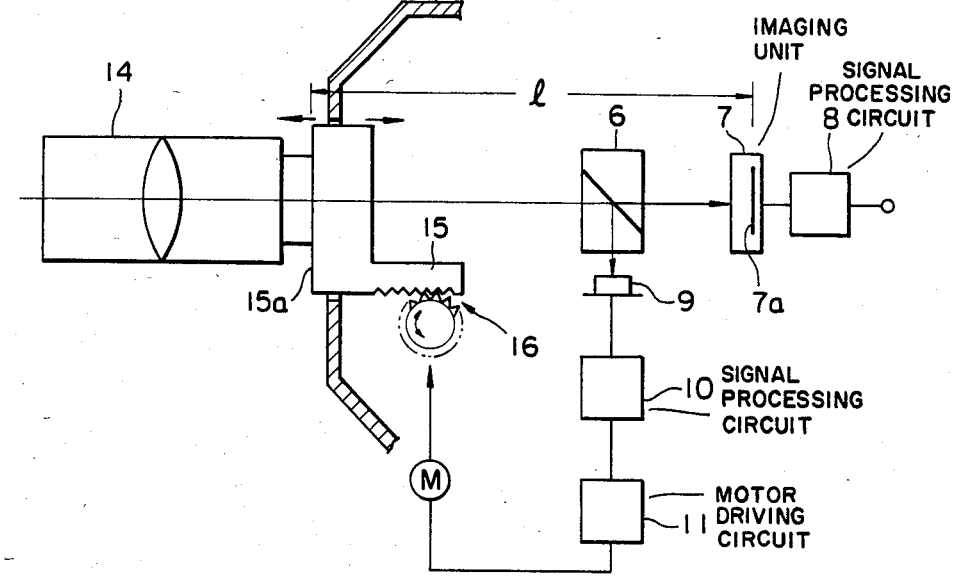
FIGS. 3 to 8 are schematic views showing respective embodiments of the automatic focusing device according to the present invention.

In the embodiment of FIG. 3, object light having passed through the taking lens 14 and carrying object data, is split by light splitter 6 to be coupled to both imaging unit 7 and focus detecting unit 9. The focus detecting unit 9 produces a detection signal which represents the out-of-focus state of the incident object light (for instance pre-focus or post-focus state). The detection signal is coupled to a signal processing circuit 10. If the detection signal does not represent the focus state, a driving circuit 11 is operated to rotate a motor M, whereby a lens mounting section 15 is moved in the directions of the optical axis through a lens mounting section driving system 16, for instance consisting of a rack and a pinion. With the movement of the lens mounting section 15a, the distance l is varied. As a result, the taking lens 14 is moved to obtain new object data. If the focus is detected, the motor M is stopped. If the focus is not detected, the sequence of operation described is repeated. When the focus is obtained, an in-focus image is projected onto the imaging plane 7a of the imaging unit 7. The image is coupled through a signal processing circuit 8 so that the in-focus image can be obtained on a television screen, not shown.

Figure 4:
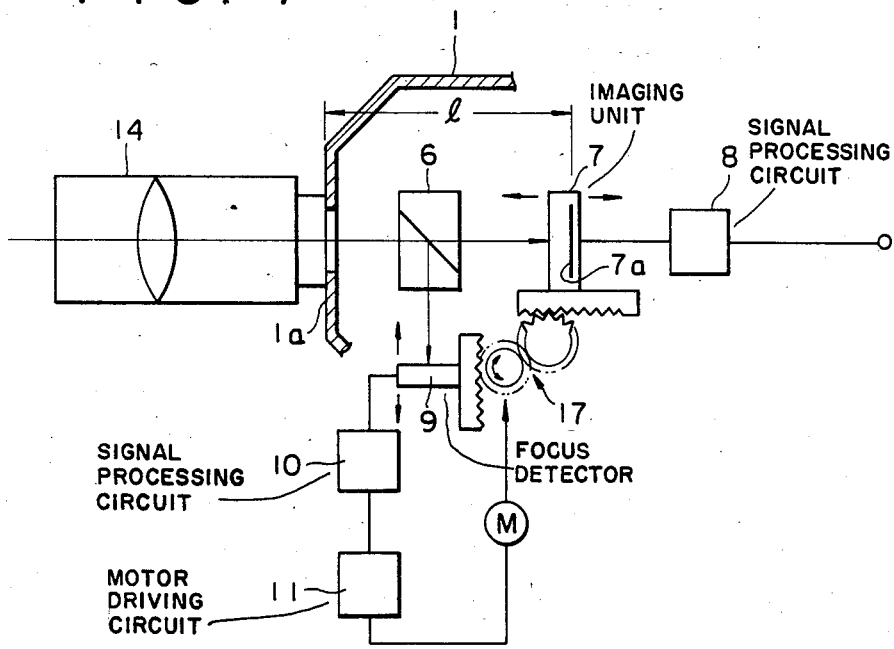

The embodiment of FIG. 4 is different from the embodiment of FIG. 3 in that the distance l is varied as the imaging plane 7a of the imaging unit 7 is moved in an interlocked relation to the focus detecting unit 9. More particularly, object data coupled from the light splitter 6 to the focus detecting unit 9 is processed to obtain a signal for driving the motor M to move an interlocked driving system, which includes two rack-and-pinion sets. The focus detecting unit 9 is moved until a focus detection signal is obtained. At this time, the in-focus image is projected onto the imaging plane 7a of the imaging unit 7.

Figure 5:
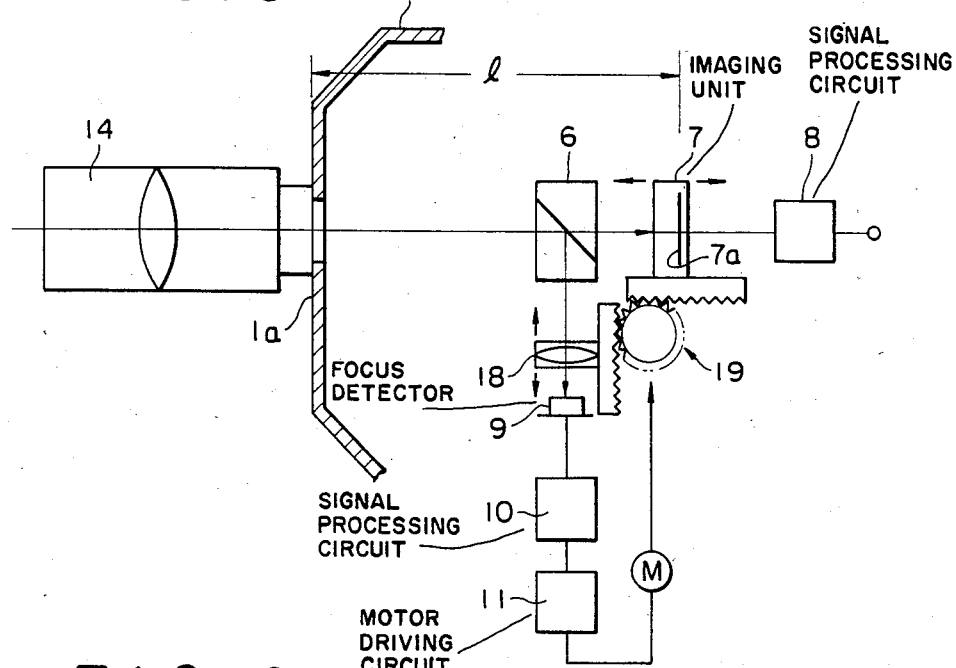

The embodiment of FIG. 5 is different from the embodiment of FIG. 4 is that a relay lens 18 is provided between light splitter 6 and focus detector 9 and that the distance l is changed with the movement of the imaging plane in an interlocked relation to the relay lens. More particularly, the relay lens 18 is moved to let a focus signal be produced from the relay lens 18. The relay lens 18 is provided with an interlock mechanism 19, which consists of two racks and one pinion and is interlocked to the imaging plane 7a of the imaging unit 7. An in-focus image is obtained at the imaging plane 7a when a focus signal is produced.

Figure 6:
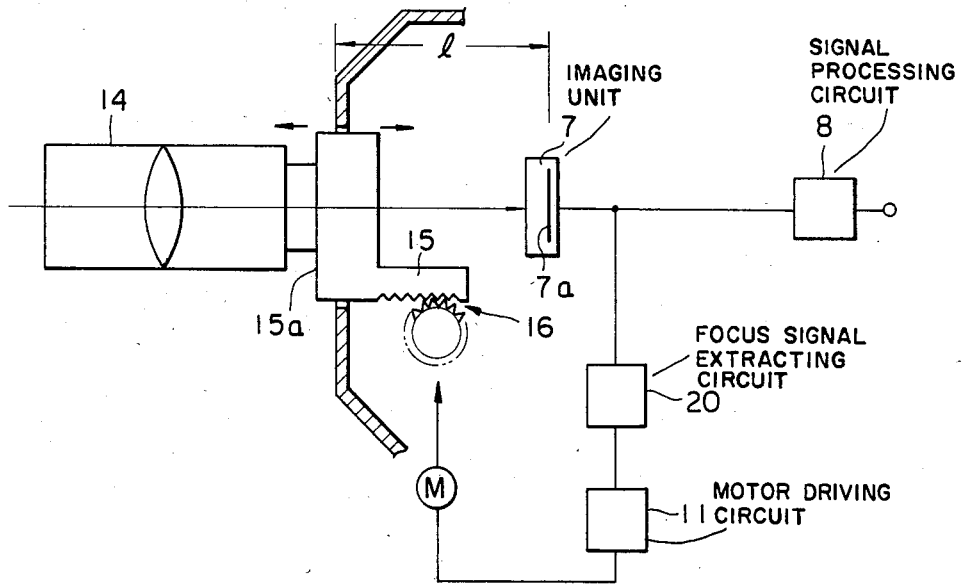

The embodiment of FIG. 6 is different from the embodiment of FIG. 3 in that it includes a focus signal extracting circuit 20, which extracts a focus signal representing the clearness of the object image projected onto part of the imaging plane 7a of the imaging unit 7, and that the output signal of the circuit 20 is used to drive the motor M so as to move a lens mounting member 15 for varying the distance l.

Figure 7:
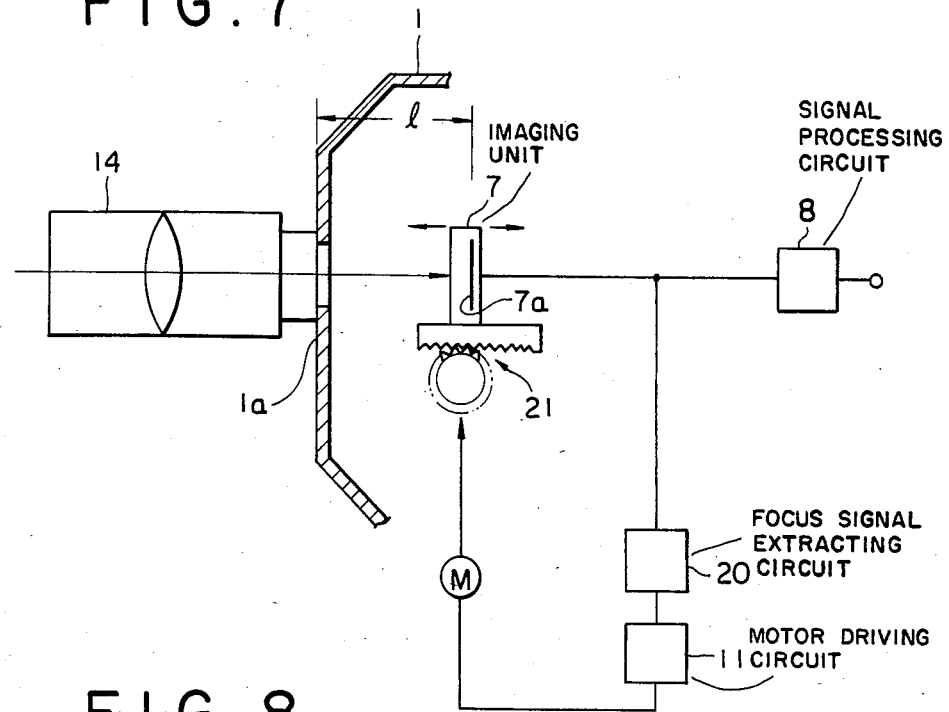

The embodiment of FIG. 7 is different from the embodiment of FIG. 6, in which the lens mounting member 15 is moved, in that the imaging plane 7a of the imaging unit 7 is moved by a imaging unit driving system 21 to vary the distance l.

Figure 8:
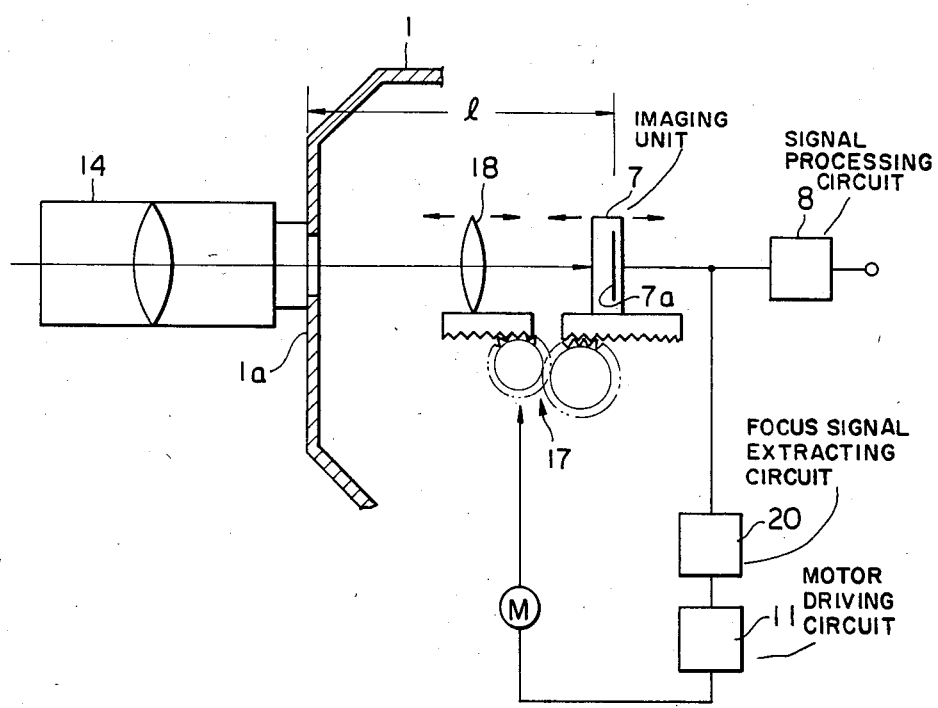

The embodiment of FIG. 8 is different from the embodiment of FIG. 7 in that a relay lens 18 is provided between lens mounting section 1a and imaging plane 7a and that the distance l between the release lens 18 and imaging plane 7a is varied in an interlocked fashion by an interlock driving system 17.

While various modes of varying the distance l have been described above, these focus detecting systems are by no means limiting, and other modes, for instance one in which both the lens mounting section and imaging plane are moved are within the scope of the invention. Further, the automatic focusing device as described may be applied to a video camera which can take not only moving images, but also still images, as well.

As has been described in the foregoing, with the automatic focusing device according to the present invention the distance between lens mounting section and imaging plane is varied according to a focus detection signal. Thus, the imaging lens is no longer involved in any driving relation at the time of the focusing, so that any lens, for instance interchangeable lenses possessed by the user, may be used. In addition, a complicated coupling driving system is no longer necessary. Thus, the cost can be reduced, maneuverability can be improved with reduction of weight, and the mass production capability and reliability can be improved. Further, no movable parts are found outside the camera body, but all the parts are accommodated in the camera body and will never interfere with any object. Thus, there is no possibility that the taking is disabled, and the photographer can operate without care of any object. Further, an excellent dust-proof property can be obtained.

What is claimed is:

1. An automatic focusing device for a video camera comprising:
    a taking lens;
    an imaging plane for receiving object data from the taking lens;
    focus detecting means for detecting focused light on the imaging plane and extracting a detection signal from said object data to provide a focus signal;
    driving means responsive to said focus signal from said focus detecting means for moving said imaging plane for focusing; and
    a camera body containing therein said driving means, said focus detecting means and said imaging plane.

2. The automatic focusing device for video camera according to claim 1 further including a light splitter housed within said camera body, and in which said focus detecting means includes a focus detecting unit for receiving the object data through said light splitter.

3. The automatic focusing device for a video camera according to claim 2, in which said focus detecting unit and said imaging plane are interlocked to each other by said driving means.

4. The automatic focusing device for a video camera according to claim 2, in which a movable relay lens is provided between said light splitter and said focus detecting unit, and in which said relay lens and said imaging plane are interlocked to each other by said driving means.

5. The automatic focusing device for a video camera according to claim 1, in which said focus detecting means includes a focus signal extracting unit for extracting the focus signal from said object data received on said imaging plane.

6. The automatic focusing device for video camera according to claim 5, in which a relay lens is provided between said taking lens and said imaging plane, and in which said relay lens and said imaging plane are interlocked to each other by said driving means.

* * * * *